B. H. SCOTT.
AUTOMOBILE TORPEDO.
APPLICATION FILED MAY 3, 1915.

1,177,280.

Patented Mar. 28, 1916.

BENJIMAN H. SCOTT,
INVENTOR

By George J. Utsch
ATTORNEY.

UNITED STATES PATENT OFFICE.

BENJIMAN H. SCOTT, OF MISHAWAKA, INDIANA.

AUTOMOBILE TORPEDO.

1,177,280.  Specification of Letters Patent. Patented Mar. 28, 1916.

Application filed May 3, 1915. Serial No. 25,635.

*To all whom it may concern:*

Be it known that I, BENJIMAN H. SCOTT, a citizen of the United States, residing at Mishawaka, in the county of St. Joseph and State of Indiana, have invented certain new and useful Improvements in Automobile Torpedoes, of which the following is a specification.

The invention relates to a torpedo designed for electrical control and involving a casing arranged to receive a motor for propelling the torpedo, a storage system for operating the motor, a storage system having normally spaced terminals, and a contact rod adapted on contact with an object to bridge the normal terminals of the storage system to induce an arc which will ignite the explosive contained in the casing, the explosive being disposed for its most effective result.

Figure 1:
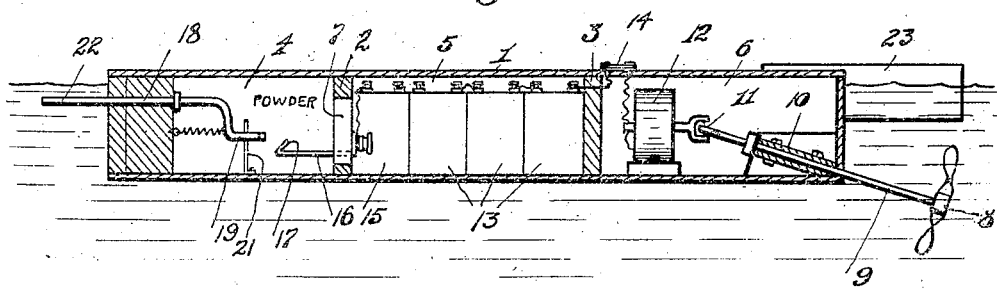
Figure 2:
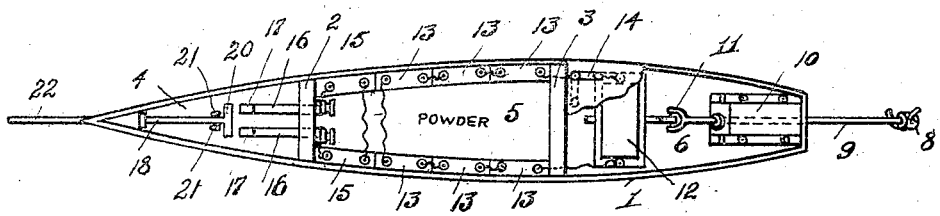
Figure 3:
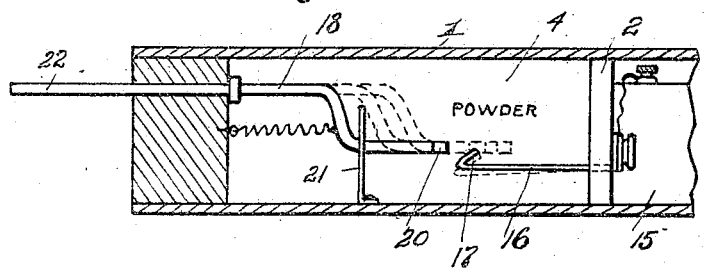

The invention in the preferred form of details will be described in the following specification, reference being had particularly to the accompanying drawings, in which:

Figure 1 is a longitudinal section partly in elevation of the improved torpedo. Fig. 2 is a plan with the cover plate removed. Fig. 3 is an enlarged vertical longitudinal section of the forward portion of the torpedo showing the sparking detail.

In the drawings the improved torpedo is shown as comprising a shell like casing 1 of cigar shape in general outline though obviously any desired shape may be used. The casing is divided by forward and rear transverse partitions 2 and 3 into three chambers, a forward chamber 4, a central chamber 5 and a rear chamber 6. The forward partition 2 is formed with an opening 7 so that the forward and central chambers or compartments communicate.

The torpedo is driven through the usual propeller 8 mounted upon a shaft 9 which extends through the casing, guided in a fixed bearing 10, and connected through any suitable connection as a universal 11 with the driving shaft of a motor 12, the latter being preferably of the electrical type. Arranged within the central compartment 5 are a series of storage batteries disposed in two series. The batteries are arranged immediately adjacent the side walls of the casing so as to leave the interior of the compartment free of obstruction for a purpose which will later appear. The batteries, arranged in any number, are as stated, provided in two series, the batteries 13 for example being connected in series and in circuit through a switch 14 mounted exteriorly of and conveniently located on the casing, with the motor 12, whereby the motor may be readily and conveniently started for propelling the torpedo. The batteries of the remaining series as 15 are also in series connection with terminals 16 in the form of spaced spring strips arranged in parallel relation and projected within the forward compartment 4, the terminal 16 having upturned hook ends 17. The forward or bow end of the torpedo is provided with a contact member 18 in the form of a rod slidably mounted in the stem and projecting at its rear end within the compartment 4, being within the compartment turned downwardly and rearwardly as at 19. The rear end has a T-head or cross bar 20, and at such elevation and of such length that the head will wipe across the hook ends 17 of the contact terminals in the reciprocation of the rod. The rod is guided between uprights 21, and its forward end extends in advance of the bow of the torpedo presenting an impact element 22 designed to be brought into contact with an object in the path of travel of the torpedo and operated by such impact to cause the rod to be moved rearwardly for the purpose stated, the arm 18 thus constitutes a movable bridging member of which the terminals 16 constitute the energized contacts, the wiping of the head 20 across the hooks and its approach to and recedance from such hook ends forming an arc to generate the necessary spark.

The chamber 4 and also the unobstructed portion of the chamber 5 is provided with powder or other explosive in any desired quantity, the sole requirement being a sufficient quantity to be effectively reached by the spark referred to. The rear end of the casing is provided with a fixed vane 23 constituting a rudder which so far as possible maintains the course of the torpedo in a straight line when once aimed or directed.

From the above description it will be apparent that the torpedo is driven as long as the storage battery charge is sufficient to operate the motor, and that if during such travel the impact element contacts with any object there will be generated an arc or sparking within the powder chamber to ignite and explode the same.

It is to be particularly noted that the current for generating the spark for igniting the explosive is in no wise dependent upon the batteries or any connections whatever with regard to the driving or propelling current, so that if for example the switch 14 should become disconnected, or the charge of the storage batteries exhausted so that the torpedo should stop there would nevertheless be power for doing the full damage, in the event it was brought into contact, through the tide, current or movement of the opposing object, with a sufficient pressure, necessarily very light to move the impact element.

What is claimed is:

1. An automatic torpedo including a casing, formed with a fixed rudder, partitions arranged in the casing providing the forward, central and rear compartments, the forward and central compartments being in open communication with each other, two independent sources of electrical energy arranged within the central compartment and spaced to provide an explosive receiving space, a propelling means for connection with one source of energy, spaced strips extending into the forward compartment and having connection with the other source of energy, a rod mounted in the forward part of the casing for longitudinal movement, said rod projecting in advance of the casing to provide an impact element, a portion of the rod extending within the forward compartment and having a cross head adapted in the movement of the rod to electrically bridge the space terminals to form an arc.

2. An automatic torpedo including a casing formed with a fixed rudder, partitions arranged in the casing providing the forward, central and rear compartments, the forward and central compartments being in open communication with each other, two independent sources of electrical energy arranged within the central compartment and spaced to provide an explosive receiving space, a propelling means for connection with one source of energy, spaced strips extending into the forward compartment and having connection with the other source of energy, a rod mounted in the forward part of the casing for longitudinal movement, said rod projecting in advance of the casing to provide an impact element, a portion of the rod extending within the forward compartment and having a cross head adapted in the movement of the rod to electrically bridge the space terminals to form an arc, the space within the forward compartment and between the sources of energy in the central compartment, providing an uninterrupted explosive receiving space.

In testimony whereof I affix my signature in presence of two witnesses.

BENJIMAN H. SCOTT.

Witnesses:
GEORGE A. KURTZ,
GEORGE J. OLTSCH.